(12) United States Patent
Horovitz et al.

(10) Patent No.: US 11,481,694 B2
(45) Date of Patent: Oct. 25, 2022

(54) SPLIT VACATION DEAL GENERATING SERVER AND EFFICIENT SPLIT DEAL GENERATING METHODS

(71) Applicant: HOLISTO LTD, Rishon LeTsiyon (IL)

(72) Inventors: Shay Horovitz, Rishon LeZion (IL);
Eran Shust, Rishon LeZion (IL);
Avraham Wortzel, Rehovot (IL)

(73) Assignee: HOLISTO LTD, Rishon LeTsiyon (IL)

( * ) Notice: Subject to any disclaimer, the term of this patent is extended or adjusted under 35 U.S.C. 154(b) by 685 days.

(21) Appl. No.: 15/742,084

(22) PCT Filed: Jul. 25, 2016

(86) PCT No.: PCT/IL2016/050813
§ 371 (c)(1),
(2) Date: Jan. 5, 2018

(87) PCT Pub. No.: WO2017/017674
PCT Pub. Date: Feb. 2, 2017

(65) Prior Publication Data
US 2018/0204145 A1 Jul. 19, 2018

Related U.S. Application Data

(60) Provisional application No. 62/197,060, filed on Jul. 26, 2015.

(51) Int. Cl.
*G06Q 10/00* (2012.01)
*G06Q 10/02* (2012.01)
(Continued)

(52) U.S. Cl.
CPC .......... *G06Q 10/02* (2013.01); *G06Q 10/025* (2013.01); *G06Q 30/0623* (2013.01);
(Continued)

(58) Field of Classification Search
None
See application file for complete search history.

(56) References Cited

U.S. PATENT DOCUMENTS 8,095,536 B1 * 1/2012 Kelly ................. G06Q 30/0201
707/723
8,898,184 B1 11/2014 Garman
(Continued)

FOREIGN PATENT DOCUMENTS

WO      00/63794 A1    10/2000
WO      03/012715 A1    2/2003
(Continued)

OTHER PUBLICATIONS

Eran Shust, splitty—Phocuswright Conference 2017I (online) TravelMedia.ie. Dec. 12, 2017 Retrieved from <https://www.youtube.com/watch?v=fipBFum83TU> TravelMedia.ie. Dec. 12, 2017 (Dec. 12, 2017), retrieved from the Internet Feb. 16, 2021.
(Continued)

*Primary Examiner* — Tonya Joseph
(74) *Attorney, Agent, or Firm* — Vorys, Sater, Seymour and Pease LLP; Anthony P. Venturino; Maryellen Feehery Hank

(57) ABSTRACT

Provided is a split vacation deal server sending queries in plural batches in which at least one batch is sent, via at least one API, to at least one data supplier server. The at least one data supplier server may include at least one policy limiting at least one current aspect of the at least one data supplier server's interaction with the split vacation deal server.

13 Claims, 3 Drawing Sheets

(51) Int. Cl.
  G06Q 50/12 (2012.01)
  G06Q 50/14 (2012.01)
  G06Q 30/06 (2012.01)
  G06F 16/951 (2019.01)
(52) U.S. Cl.
  CPC ............. *G06Q 50/12* (2013.01); *G06Q 50/14* (2013.01); *G06F 16/951* (2019.01)

(56) References Cited

U.S. PATENT DOCUMENTS

| | | |
|---|---|---|
| 9,760,959 B2 | 9/2017 | Nelson et al. |
| 2002/0091535 A1 | 7/2002 | Kendall et al. |
| 2004/0267567 A1 | 12/2004 | Barrera et al. |
| 2005/0033614 A1* | 2/2005 | Lettovsky ............ G06Q 10/025 705/5 |
| 2005/0251497 A1 | 11/2005 | Barth et al. |
| 2007/0067193 A1 | 3/2007 | Robertson |
| 2007/0226020 A1 | 9/2007 | Park |
| 2007/0260495 A1 | 11/2007 | Mace et al. |
| 2009/0030743 A1 | 1/2009 | Tussy |
| 2009/0063167 A1 | 3/2009 | Bartot et al. |
| 2010/0191550 A1 | 7/2010 | Hutson |
| 2010/0198628 A1 | 8/2010 | Rayner |
| 2010/0293011 A1 | 11/2010 | Lebreton et al. |
| 2011/0099038 A1 | 4/2011 | Nishida |
| 2011/0167028 A1* | 7/2011 | Purang ................... G06Q 10/02 706/45 |
| 2011/0218830 A1* | 9/2011 | Gonzalez ............... G06Q 10/10 707/769 |
| 2012/0143882 A1* | 6/2012 | Zheng ................... G06Q 10/08 707/E17.069 |
| 2013/0132137 A1 | 5/2013 | Norrid |
| 2014/0067435 A1 | 3/2014 | Hasnas |
| 2014/0089020 A1 | 3/2014 | Murphy |
| 2014/0103265 A1 | 4/2014 | Becks et al. |
| 2014/0108067 A1 | 4/2014 | Gluhovsky et al. |
| 2014/0337063 A1* | 11/2014 | Nelson ................... G06Q 10/02 705/5 |
| 2014/0337068 A1 | 11/2014 | Nelson et al. |
| 2015/0019383 A1 | 1/2015 | Truong |
| 2017/0213161 A1 | 7/2017 | Moati et al. |
| 2018/0012161 A1 | 1/2018 | Shust et al. |
| 2018/0204145 A1 | 7/2018 | Horovitz et al. |

FOREIGN PATENT DOCUMENTS

| | | |
|---|---|---|
| WO | 2011/042903 A1 | 4/2011 |
| WO | 2016/030778 A1 | 3/2016 |
| WO | 2016/103265 A1 | 6/2016 |
| WO | 2017/017674 A1 | 2/2017 |

OTHER PUBLICATIONS

Kayak, Nov. 12, 2018, 1 page, Retrieved from the Internet: URL: http://www.kayak.com/featureHelp/splitbooking.
Audet et al. (2016). Blackbox and derivative-free optimization: theory, algorithms and applications. Optim Eng. vol. 17, pp. 1-2.
Wikipedia: "Bayesian optimization", Internet Article, Dec. 12, 2019 (Dec. 12, 2019), Retrieved from the Internet: URL:https://en.wikipedia.org/wiki/Bayesian_optimization [retrieved on Nov. 25, 2020]; 5 pages.
Wikipedia: "Reinforcement learning", Internet Article, Dec. 8, 2019, 12 pages, Retrieved from the Internet: URL: https://en.wikipedia.org/wiki/Reinforcement_learning [retrieved on Nov. 25, 2020].
Wikipedia: "Q-learning", Internet Article, Dec. 6, 2019, 8 pages, Retrieved from the Internet: URL: https://en.wikipedia.org/wiki/Q-learning [retrieved on Nov. 25, 2020].
Siteminder: "Metasearch engines: Finding new direct revenue for your hotel", Internet Article, Nov. 25, 2020, 19 pages, Retrieved from the Internet: URL: https://www.siteminder.com/r/hotel-distribution/hotel-metasearch/current-state-metasearch-can-hotel-find-real-value.
Manoj, Bulletins Teknokraaft: "The curious case of Look to Book Ratio", Internet Article, Aug. 18, 2009, 5 pages, Retrieved from the Internet: URL: https://www.teknokraaft.com/techbulletin.aspx?nlId=46 [retrieved on Nov. 25, 2020].
Wikipedia: "Probabilistic classification", Internet Article, Sep. 25, 2019, 3 pages, Retrieved from the Internet: URL: https://en.wikipedia.org/wiki/Probabilistic_classification [retrieved on Nov. 25, 2020].
GitHub, Aug. 14, 2019, 3 pages, Retrieved from the Internet: URL: https://github.com/dennybritz/reinforcement-learning.
Zap Group: "Zap Price Comparisons", 3 pages, Retrieved from the Internet: URL: http://corporate.zapgroup.co.il/en/zap-price-comparisons [retrieved on Nov. 25, 2020].
Google Ads, Nov. 25, 2020, 6 pages, Retrieved from the Internet: URL: https://ads.google.com/home/.
Jefford et al. (2007). Professional BizTalk Server 2006. 699 pages, John Wiley & Sons.
Wikipedia: "Global distribution system", Internet Article, Nov. 25, 2014 (Nov. 25, 2014), XP055483441, 3 pages, Retrieved from the Internet: URL: https://en.wikipedia.org/w/index.php?title=Global_distribution_system&oldid=635439407.
Wikipedia: "Web scraping", Internet Article, Dec. 5, 2014 (Dec. 5, 2014), XP055483473, 5 pages, Retrieved from the Internet: URL: https://en.wikipedia.org/w/index.php?title=Web_scraping&oldid=636752860.
Expedia: API definition, (2017), 14 pages, Retrieved from the Internet: URL: https://web.archive.org/web/20170117102042/https://expediaconnectivity.com/apis/availability-rates-restrictions-booking-notification-retrieval-and-confirmation/expedia-quickconnect-avail-rates-api/reference.html.
Expedia: FAQ & Guides, (2017), 27 pages, Retrieved from the Internet: URL: https://web.archive.org/veb/20170117143117/https://expediaconnectivity.com/apis/availability-rates-restrictions-booking-notification-retrieval-and-confirmation/expedia-quickconnect-avail-rates-api/guides.html.
Expedia: FAQ & Guides, (2017), 22 pages, Retrieved from the Internet: URL: https://web.archive.org/web/20170117143453/https://expediaconnectivity.com/apis/product-management/product-api/guides.html.
It's time to trade rule technology for state of the art AI? Internet Article, (2018), 2 pages, Retrieved from the Internet: URL: https://dmcommunity.org/2018/04/03/its-time-to-trade-rule-technology-for-state-of-the-art-ai/ [retrieved on Aug. 28, 2019].
Klinov et al., (Oct. 2010). The consistency of the CADIAG-2 knowledge base: A probabilistic approach. In International Conference on Logic for Programming Artificial Intelligence and Reasoning (pp. 432-446). Springer, Berlin, Heidelberg.
IEEE Conference Search Results; 3 pages, Nov. 19, 2019, available online at https://conferences.ieee.org/conferences_events/conferences/search?q=usa.
Cragun. (1987). A decision-table-based processor for checking completeness and consistency in rule-based expert systems. International Journal of Man-Machine Studies, 26(5), 633-648. https://www.sciencedirect.com/science/article/pii/S0020737387800767.
Knight, MIT Technology Review: "The dark secret at the heart of AI", (2017), Apr. 11, 2017, 18 pages, Retrieved from the Internet: URL: https://www.technologyreview.com/s/604087/the-dark-secret-at-the-heart-of-ai/ [retrieved on Aug. 28, 2019].
Conal Conference Alerts; Conferences in United States of America; 1 page; Aug. 26, 2019, available online at http://www.conferencealerts.com/country-listing?country=United+States+of+America.
Quinlan. (Aug. 1983). Consistency and plausible reasoning. In Proceedings of the Eighth international joint conference on Artificial intelligence—vol. 1 (pp. 137-144). Morgan Kaufmann Publishers Inc. https://dl.acm.org/citation.cfm?id=1623405.
Escapia: "Optimizing Nightly Rates Price Consistency for HomeAway Listings", (2017), 8 pages, Retrieved from the Internet: URL: http://support.homeawaysoftware.com/articles/en_US/Article/HASW-Escapia-Optimizing-Price-Accuracy-for-HomeAway-Listings?&&subdir=Escapia.

(56) References Cited

OTHER PUBLICATIONS

Wikipedia: "Travel website", Internet Article, May 17, 2014 (May 17, 2014), XP055407349, 4 pages, Retrieved from the Internet: URL: https://en.wikipedia.org/w/index.php? title=Travel_website &oldid=608969380 [retrieved on Sep. 18, 2017].
Wikipedia: "Metasearch engine", Internet Article, Dec. 14, 2014 (Dec. 14, 2014), XP055630870, 8 pages, Retrieved from the Internet: URL:https://en.wikipedia.org/w/index.php? title=Metasearch_ engine&oldid=638062023 [retrieved on Oct. 10, 2019].
Wikipedia: "Database caching", Internet Article, May 20, 2014 (May 20, 2014), XP055630883, 3 pages, Retrieved from the Internet: URL:https://en.wikipedia.org/w/index.php? title=Database_ caching&oldid=609414325 [retrieved on Oct. 10, 2019].
Tarkoma et al., "Publish / Subscribe Systems: Design and Principles 1st Edition", Aug. 13, 2012 (Aug. 13, 2012), Wiley, XP055542951, ISBN: 978-1-119-95154-4 pp. ToC,Ch01-Ch02,Ch04,Ch06-Ch07,Ch12,Ch14,Ind.

* cited by examiner

Fig. 2

100. a deal request from end user, including end user request properties e.g. time-interval inter alia, is sent e.g. via a data network to Decomposition Module 10.

↓

110: Module 10 uses a processor to compute all (or some) possible splits of the request's time interval and stores results in the Active Requests split memory, db 15, e.g. in a file marked with request id.

↓

120: quota vector representing, for each supplier, the allowed number of API queries (of looks for hotel prices) allotted to the upcoming/current request, is maintained in quote vector processor 20 which compares policy state stored in db 40 to policy rules stored in db 50, for each supplier, where policy states are zeroed at suitable times e.g. at beginning of calendar month for policy rules that limit a parameter per calendar month

↓

130. Query Execution Module 60 fetches the current Quota vector from the Policy Module/ processor 20 and fetches possible splits from Splits Decomposition module 10

↓

140. Query Execution Module 60 generates a sequence of batch/es of queries by prioritizing splits fetched from module 10 using any suitable prioritization scheme

↓

150: Query Execution Module 60 executes batch/es of queries generated in operation 140, batch by batch, in order, where less than all possible queries are typically executed since the number of launched queries is limited so as to comply with the SLAs/Policies of the suppliers as per current quota vector, for each relevant supplier) and/or launched queries are terminated once responses to the queries are deemed to "save enough". Each query in a batch may be sent e.g. via an API to a data supplier server, however queries for which a (still valid) response has been cached earlier in cache 70, need not be sent to any data supplier server.

↓

160: Query Execution Module 60 responds to end user by presenting one or more deals satisfying the time-interval and other end user request properties. A Deal presented to a user may be a combination e.g. concatenation or set of query responses executed in operation 150, re sub-intervals of the interval requested by the end user and may include cached responses.

↓

170: query execution module 60 increments the current policy state as stored in policy state db 40 to reflect queries sent in operation 150

FIG. 3

310: sending queries in plural batches in series, thereby to define a sequence of batches sent one after another rather than in parallel, each batch including at least one query and wherein at least one query pertains to at least one possible split of the end-user's stipulated time period into shorter time periods and wherein at least one batch is sent, via at least one API, to at least one data supplier server having at least one policy limiting at least one current aspect of the at least one data supplier server's interaction with the split vacation deal server

↓

320: storing at least one response, received via at least one API from at least one specific data supplier server, as a record in a cache, the record including a cost, a time period to which the cost applies, and an ID of the specific data supplier server, and incrementing monitoring data quantifying at least the specific current aspect of the at least one data supplier server's interaction with the split vacation deal server;

↓

330: after sending at least one individual batch from among the batches terminating sending of batches if a predetermined logical combination of at least the following two stopping criteria a, b, computed by the processor, is met:
  a. at least one "saves enough" stopping criterion is met by at least one individual numerical value of at least one individual response from among responses received to the queries, compared to at least one default numerical value; and
  b. at least one stored "avoid data supplier policy-defined limit" stopping criterion reflecting at least one limit defined by a policy for at least one specific aspect of the at least one data supplier server's interaction with the split vacation deal server has been reached by monitoring data quantifying at least the specific aspect of the at least one data supplier server's interaction with the split vacation deal server;
  and otherwise, if the predetermined logical combination of at least the stopping criteria a, b is not met, sending at least one more batch from among the plural batches,

↓

340: generating at least one user request response, comprising an offer for a vacation deal for the time period, to the at least one end-user by combining at least two responses from among responses received to the queries into a single user request response and sending the at least one user request response to the at least one end-user, when at least one of the following occurences has transpired: 1. all splits of the user's request have been queried; and/or 2. sending of batches has terminated because the predetermined logical combination of at least stopping criteria a, b has been met.

SPLIT VACATION DEAL GENERATING SERVER AND EFFICIENT SPLIT DEAL GENERATING METHODS

REFERENCE TO APPLICATIONS

Priority is claimed from U.S. Provisional Patent Application No. 62/197,060 entitled "Methods and process for composing price-reduced hotel bookings", and filed on Jul. 26, 2015 and from PCT/IL2015/051249 "System and method for optimizing utilization of a population of underutilized physical facilities . . . ", filed Dec. 23, 2015.

FIELD OF THIS DISCLOSURE

The present invention relates generally to electronic booking and more particularly to electronic processing of vacation deals.

BACKGROUND FOR THIS DISCLOSURE

Conventional external vacation booking suppliers include expedia.com; booking.com and many more online platforms.

KAYAK.com has hotel search software functionality. The corporate website at the following link: http://www.kayak.com/featureHelp/splitbooking describes that: "Sometimes you can save by splitting your booking between two sellers. For example, you want to stay at a hotel from Monday to Friday. One site offers a cheaper rate for the nights of Monday and Tuesday, but another site has a cheaper rate for the nights of Wednesday, Thursday and Friday. KAYAK's hotel search makes it easy to find these savings. All you have to do is purchase two separate bookings. Here's how to purchase a Hacker Rate: Step 1. See all booking options in your search. Step 2. Verify both parts are available. Click both "Go" buttons and verify that the prices on the travel site are accurate. Step 3. Book both parts of your stay.".

TRAVELOCITY.com has hotel search software functionality. The corporate website allows "Travelocity Split Rate" for a portion of the available hotel booking deals—which is a reduced aggregated price for separate booking deals that together cover the requested booking date range. To get that deal, the user completes two separate bookings manually at checkout.

State of the art booking systems include the following published patent documents: document WO2016030778 (A1) describing lodging room price optimization; US2014337063 describing methods for minimizing travel costs for multi-night stays; US2010293011 describing booking management; US2009030743 describing an intelligent hotel reservation system; US2015019383 describing an online vacation rental booking system; US2011218830 describing a bottom-up optimized search system; US2009063167 describing a hotel rate analytic system; WO03012715 describing a pricing system and method; and WO2016030778 A1 describing a lodging room price optimization method The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

A policy consideration that may be set in the context of the present invention is a look-to-book policy—where an entity that is connected to the apparatus such as, but not limited to a Global Distribution System (denoted as GDS), manages and/or enforces a certain ratio between the number of hotel stay price quote queries and the number or reservations that are made within a certain period of time; this policy limits the number of price quote requests that an optimization process for meeting the target function may query. Accordingly, some embodiments of the present invention may be applicable and beneficial for finding attractive hotel booking splits that are near optimal with regards to a target function such as, but not limited to, minimal total fee for a desired hotel stay under limited amount of price quote requests that comply with a look-to-book policy.

A responsiveness consideration that may be relevant in the context of the present invention is a customer response time for a query—where an entity that is connected to the apparatus such as, but not limited to a GDS, provides query results within a certain time range, and where requesting multiple queries may not provide the relevant responses in a responsive manner—as the customer would have to wait too much time for the results to appear.

A variety consideration that may be relevant in the context of the present invention is the case of a split that is composed of bookings from more than one GDS. This dramatically increases the number of possible performing the operations herein. This apparatus may be specially constructed for the desired purposes, or it may comprise a general purpose computer selectively activated or reconfigured by a computer program stored in the computer. The processes and displays presented herein are not inherently related to any particular computer or other apparatus. splits as there are splits composed of different GDSs.

A booking split finding process may employ a Bloom filter, a Distributed Cache, a Machine Learning Classification algorithm, a Sketch, and a Scalable infrastructure. A requesting entity (that may be a customer, a GDS, an OTA or other) queries for a desired hotel stay; the query is being forwarded to a filtering mechanism (may be implemented with a bloom filter for example) that in turn looks whether that request was already asked recently and if so, get the response to that request from the cached results managed by a caching module such as, but not limited to a distributed cache; otherwise, the request is being transferred to a booking date range decomposition module that generates the possible splits for the requested date range. The possible splits are sent for a machine learning module that employs a classification algorithm wherein the request is being classified as potentially beneficial for the target function or not; the learning algorithm collects the requests and the final target and updates the learning model—that is targeted to learn pricing policies and trends of each combination that may be composed of, but not limited to an hotel chain, a given location, a hotel star rating, and a split in days of at least 2 parts, in respect to the classification labels of the target function—leading to an outcome of predicting if the given request will provide a near optimal split or not. The possible splits may be devised by a split generating module—ranging over all or samples of possible splits in accordance with the desired stay data range and the number of splits. In case that the request was classified as beneficial for the target function (near optimal), the original query will split into multiple queries in accordance with the near optimally predicted split and forward by the Execute Queries module to the online sources—to receive price quotes for those splits. An alternative process may manage requests that are composed of, but not limited to an hotel chain, a given location, a hotel star rating, and a desired stay date range (without the split) where the classifier algorithm will determine the near-optimal split that yields lower price compared to the original non-split request. In case that the request was classified as non-beneficial for the target function, either a full scan of all possible splits or a sampled scan will be performed. In another embodiment a multi-level learning model may be utilized where multiple classification algorithms provide classification in one level, and another classification method decides on the optimal class considering the results of all algorithms. Another embodiment may contain an offline source such as a database of price quotes that were collected in batch process, periodically or triggered by an event Upon receiving the price quotes-a Booking Composition module builds possible composition out of split items that cover the originally requested date range with the lowest prices.

In another embodiment, a rule based system may be used instead of the classifier—for example using decision tree classifier as ID3, C4.5, C5 or other. Output decision tree may be used to query online whether a requested split is likely to provide lower cost for the requested stay compared to the full date range query for price.

In another embodiment a sketch mechanism may be used in order to find emerging trends in the requests—for example a Count-Min-Sketch mechanism may be used to find the top requested date ranges such that a further search process on the optimal splits of these date ranges will be performed—this way limit the number of requests for highly distributed date ranges in future requests.

In another embodiment, a look to book optimization system is being used where the target is to maintain a look-to-book ratio that is set as policy by one or more of the sources for price quotes. One or more of the following methods may be used in order to manage the look-to-book ratio:

Requesting for all possible splits—in case that there is no look-to-book policy

Random sampling selection of requests

Sampling between different customers queries—by preventing a set of queries of splits for a portion of the customers and limiting the queries to a sample of the customers (as opposed to sample of queries per customer)—it is possible to query all (or an increased ratio of) splits for the customers that were sampled—this way increase the chance that a reduced price split will be find—and maintain the look-to-book ratio accordingly Serial/Semi Parallel execution of queries—until a split that saves a predefined amount was achieved. This way we don't send all requests in parallel—and stop the scan of split queries when the desired price was found.

Filter selection by selected brands—by filtering the queries only to selected hotel brands (that were learned previously to have reduced price splits)—we increase the look-to-book ratio as opposed to not filtering the queries for any particular brand.

Filter selection by selected hotels—by filtering the queries only to specific hotels (that were learned previously to have reduced price splits)—we increase the look-to-book ratio as opposed to not filtering the queries for any particular hotel.

Filter selection by specific days of week—same as previous—depending on specific days of week Filter selection by days close to events—same as previous—depending on time vicinity to an event—such as holidays, conferences etc.

Filter selection by geographical area of hotel—same as previous—depending on defined geographical areas that are likely to increase the look-to-book ratio Filter selection by most popular range splitting index—same as previous—for a specific splitting index that is likely to increase the look-to-book ratio Filter selection based on a composition of more than one of the above filtering methods.

Certain embodiments seek to provide a data repository storing stopping criteria per external or even internal (aka non-external) supplier e.g. a policy rules database as described herein.

Certain embodiments seek to provide a server which may be operative to perform some or all of the following:

a. Server sends to internal (e.g. not via a network) or external source/s, queries for at least some date-splits for at least some booking requests from end users.

b. Server receives from internal or external source/s, and stores in memory/cache, query responses to the queries; each query response is stored in a record whose fields include date range location e.g. city and expiry date (e.g. date on which query response was received from internal or external source and/or, if available, date on which query response is known to expire).

c. For at least one booking request B_r having a location L or a list of hotels LH and date range d, a server is operative to generate, and send to end user, a booking response including at least one recommended date-split compiled using at least one query response from memory/cache whose location is L and whose date range is included in d.

d. if end-user approves a recommended date-split in the booking response, server may send a confirming query to internal or external source/s for the recommended date-split The present invention typically includes at least the following embodiments:

Embodiment 1

A method performed by a split vacation deal generating server including at least one processor, the method comprising:

for at least one user's request provided to the split vacation deal server by at least one end-user and requesting an offer for a vacation deal including stipulating a vacation time period:

i. sending queries in plural batches in series, thereby to define a sequence of batches sent one after another rather than in parallel, each batch including at least one query and wherein at least one query pertains to at least one possible split of the end-user's stipulated time period into shorter time periods and wherein at least one batch is sent, via at least one API, to at least one data supplier server having at least one policy limiting at least one current aspect of the at least one data supplier server's interaction with the split vacation deal server;

ii. storing at least one response, received via at least one API from at least one specific data supplier server, as a record in a cache, the record including a cost, a time period to which the cost applies, and an ID of the specific data supplier server, and incrementing monitoring data quantifying at least the specific current aspect of the at least one data supplier server's interaction with the split vacation deal server;

iii. after sending at least one individual batch from among the batches:

terminating sending of batches if a predetermined logical combination of at least the following two stopping criteria a, b, computed by the processor, is met:

a. at least one "saves enough" stopping criterion is met by at least one individual numerical value of at least one individual response from among responses received to the queries, compared to at least one default numerical value; and b. at least one stored "avoid data supplier policy-defined limit" stopping criterion reflecting at least one limit defined by a policy for at least one specific aspect of the at least one data supplier server's interaction with the split vacation deal server has been reached by monitoring data quantifying at least the specific aspect of the at least one data supplier server's interaction with the split vacation deal server;

and otherwise, if the predetermined logical combination of at least the stopping criteria a, b is not met, sending at least one more batch from among the plural batches, and iv. generating at least one user request response, comprising an offer for a vacation deal for the time period, to the at least one end-user by combining at least two responses from among responses received to the queries into a single user request response and sending the at least one user request response to the at least one end-user, when at least one of the following has occurred:

1. all splits of the user's request have been queried; and/or
2. sending of batches has terminated because the predetermined logical combination of at least stopping criteria a, b has been met.

Example APIs suitable for Embodiment 1 may for example include a UDP based protocol, a TCP based protocol, an HTTP (e.g. on top of TCP) based protocol, a -REST Service (e.g. on top of HTTP), an Inter Process Communication (as in Named Pipes, Shared Memory, Sockets, Memory Mapped File), Serialization to File and DeSerialization from File based protocol, -Database Read/Write as a messaging protocol (both relational DB (as in, say, MySQL, Oracle, MSSql), Document based DB (as in MongoDB), Key-Value store DB (as in Redis, Riak), Columnar DB (as in Cassandra, HBase)), a Remote Procedure Call based protocol (as in, say, CORBA, JSON-RPC, WCF), Messaging Queue based protocol (as in, say, MSMQ, Kafka, RabbitMQ)

It is appreciated that certain batches of queries or portions thereof may also be sent to caches, rather than to or in addition to, data supplier servers.

A query is said to pertain to a split of a stipulated time period into shorter time periods if the query requests data regarding at least one deal for at least one of the shorter time periods. For example, a query which pertains to a split of the 1-4 Jan. 2016 time period may request data regarding a deal for 1-2 January. Or, the query may request data regarding a deal for 3-4 January. Or, a single query may request data regarding plural deals each pertaining to one of the shorter time periods included within or equaling 1-4 Jan. 2016 e.g. the single query may request data regarding a deal for 1-2 January and regarding a deal for 3-4 January.

A single split vacation deal generating server may send batches to several supplier servers of which only some, perhaps are external and of which only some, perhaps, have an interaction limiting policy; others of the supplier servers may have no such policy in which case a policy rule server may store, for each such supplier server a "zero policy" indicative of non-existence of any policy, for that supplier server.

Embodiment 2

A method according to any of the preceding embodiments, and also comprising: v. for at least one individual user request response generated by the combining, for which the end-user has provided an acceptance message to the split vacation deal server and for which at least one of the at least two responses was provided by the cache rather than by an external supplier, corroborating the individual user request response by sending at least one query corresponding to the at least one response provided by the cache and including a specific external supplier's ID, via an API to the data supplier identified by the ID.

Embodiment 3

A method according to any of the preceding embodiments, wherein at least some queries corresponding to at least some splits are sent to the internal cache and if responses to at least some of the queries are available in the cache, at least some of the queries are not sent to any data supplier server.

Embodiment 4

A method according to any of the preceding embodiments, and also comprising providing a computer-implemented "policy rules" repository storing "avoid data supplier policy-defined limit" stopping criteria per data supplier.

Embodiment 5

A method according to any of the preceding embodiments, wherein the "avoid data supplier policy-defined limit" stopping criterion comprises, for at least one data supplier, a look-to-book limit.

Embodiment 6

A method according to any of the preceding embodiments, wherein the "avoid data supplier policy-defined limit" stopping criterion comprises, for at least one data supplier, a limit on number of queries sent by the a split vacation deal server to the data supplier server per unit time.

It is appreciated that a single supplier may enforce plural policies such as a look-to-book limiting policy and a call limit policy.

Embodiment 7

A method according to any of the preceding embodiments, wherein the batches are ordered such that all other things being equal, queries which bring the at least one specific aspect closer to the data supplier policy-defined limit to a lesser degree are assigned to an earlier batch, whereas queries which bring the at least one specific aspect closer to the data supplier policy-defined limit to a greater degree, are assigned to a later batch.

Embodiment 8

A method according to any of the preceding embodiments, wherein the terminating comprises terminating sending of batches if either of at least the stopping criteria a, b are met and if neither of stopping criteria a, b are met, sending at least one more batch from among the plural batches.

Embodiment 9

A computer program product, comprising a non-transitory tangible computer readable medium having computer readable program code embodied therein, the computer readable program code adapted to be executed to implement a method performed by a split vacation deal generating server including at least one processor, the method comprising:
for at least one user's request provided to the split vacation deal server by at least one end-user and requesting an offer for a vacation deal including stipulating a vacation time period:
  i. sending queries in plural batches in series, thereby to define a sequence of batches sent one after another rather than in parallel, each batch including at least one query and wherein at least one query pertains to at least one possible split of the end-user's stipulated time period into shorter time periods and wherein at least one batch is sent, via at least one API, to at least one data supplier server having at least one policy limiting at least one current aspect of the at least one data supplier server's interaction with the split vacation deal server;
  ii. storing at least one response, received via at least one API from at least one specific data supplier server, as a record in a cache, the record including a cost, a time period to which the cost applies, and an ID of the specific data supplier server, and incrementing monitoring data quantifying at least the specific current aspect of the at least one data supplier server's interaction with the split vacation deal server; and
  iii. after sending at least one individual batch from among the batches:
  terminating sending of batches if a predetermined logical combination of at least the following two stopping criteria a, b, computed by the processor, is met:
  a. at least one "saves enough" stopping criterion is met by at least one individual numerical value of at least one individual response from among responses received to the queries, compared to at least one default numerical value; and
  b. at least one stored "avoid data supplier policy-defined limit" stopping criterion reflecting at least one limit defined by a policy for at least one specific aspect of the at least one data supplier server's interaction with the split vacation deal server has been reached by monitoring data quantifying at least the specific aspect of the at least one data supplier server's interaction with the split vacation deal server;
  and otherwise, if the predetermined logical combination of at least the stopping criteria a, b is not met, sending at least one more batch from among the plural batches, and
  iv. generating at least one user request response, comprising an offer for a vacation deal for the time period, to the at least one end-user by combining at least two responses from among responses received to the queries into a single user request response and sending the at least one user request response to the at least one end-user, when at least one of the following has occurred:
  1. all splits of the user's request have been queried; and/or
  2. sending of batches has terminated because the predetermined logical combination of at least stopping criteria a, b has been met.

Embodiment 10

A split vacation deal generating system, the system comprising:
A server including at least one processor, programmed to perform, for at least one user's request provided to the split vacation deal server by at least one end-user and requesting an offer for a vacation deal including stipulating a vacation time period:
  i. sending queries in plural batches in series, thereby to define a sequence of batches sent one after another rather than in parallel, each batch including at least one query and wherein at least one query pertains to at least one possible split of the end-user's stipulated time period into shorter time periods and wherein at least one batch is sent, via at least one API, to at least one data supplier server having at least one policy limiting at least one current aspect of the at least one data supplier server's interaction with the split vacation deal server;
  ii. storing at least one response, received via at least one API from at least one specific data supplier server, as a record in a cache, the record including a cost, a time period to which the cost applies, and an ID of the specific data supplier server, and incrementing monitoring data quantifying at least the specific current aspect of the at least one data supplier server's interaction with the split vacation deal server;
  iii. after sending at least one individual batch from among the batches:
  terminating sending of batches if a predetermined logical combination of at least the following two stopping criteria a, b, computed by the processor, is met:
  a. at least one "saves enough" stopping criterion is met by at least one individual numerical value of at least one individual response from among responses received to the queries, compared to at least one default numerical value; and
  b. at least one stored "avoid data supplier policy-defined limit" stopping criterion reflecting at least one limit defined by a policy for at least one specific aspect of the at least one data supplier server's interaction with the split vacation deal server has been reached by monitoring data quantifying at least the specific aspect of the at least one data supplier server's interaction with the split vacation deal server;
  and otherwise, if the predetermined logical combination of at least the stopping criteria a, b is not met, sending at least one more batch from among the plural batches, and
  iv. generating at least one user request response, comprising an offer for a vacation deal for the time period, to the at least one end-user by combining at least two responses from among responses received to the queries into a single user request response and sending the at least one user request response to the at least one end-user, when at least one of the following has occurred:

1. all splits of the user's request have been queried; and/or
2. sending of batches has terminated because the predetermined logical combination of at least stopping criteria a, b has been met.

Embodiment 11

The method of any of the preceding embodiments, which is performed for less than all requests provided by a population of end users.

Embodiment 12

The method of any of the preceding embodiments, which is performed for a randomly selected subset of requests provided by a population of end users.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIG. 2 is a simplified flow diagram of an example method of operation for the system of FIG. 1 for (some of e.g. a randomly selected subset of, or) each end user request from among a plurality e.g. stream of end user requests.

FIG. 3 is a method which may be performed by a server, aka split vacation deal generating server, including at least one processor, which may or may not comprise the server of FIG. 1, for at least one user's request provided to the split vacation deal server by at least one end-user and requesting an offer for a vacation deal including stipulating a vacation time period.

Figure 1:
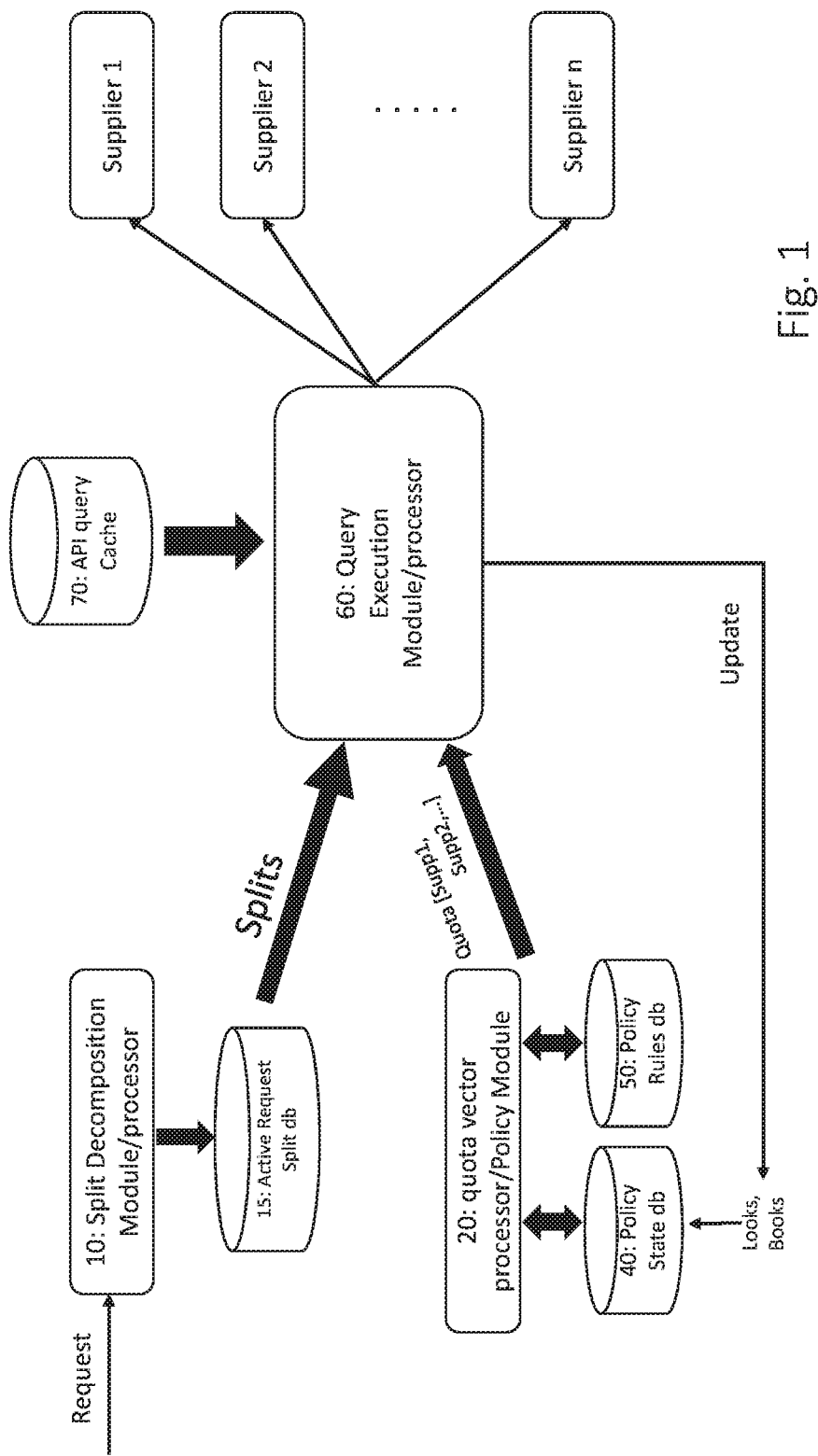
FIG. 1 is a simplified functional block diagram of a split vacation deal server in accordance with certain embodiments.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality herein may be implemented in software, firmware, hardware or any combination thereof. Functionality stipulated as being software-implemented may be implemented by an equivalent hardware module and vice-versa.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data may be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

FIG. 1 is a simplified functional block diagram of a split vacation deal server in accordance with certain embodiments. The server and an example Supplier Query Policy Management method performed thereby, are now described.

A policy rules database 50, aka "condition database" aka (external or internal) data supplier policy database, stores a policy (aka query policy) in computer-implemented memory limiting split vacation deal server (external or internal) supplier interactions, for each data supplier server or module. For example, the database 50 may store data regarding the following policies for each of 6 (more generally n) data suppliers, namely supplier1 (aka supp1), . . . supplier6 (aka supp6):

Supplier 1: policy=API Calls Limit which limits Queries per time period (such as but not limited to per second, hour, day, or month) or per a combination of more than one time period.

Supplier 2: policy=Look to Book ratio which limits Queries/Bookings per time period Supplier 3: policy which limits (for each of the supplier's end users of which query execution module 60 is one) Completed purchases/Total Website Visitors Supplier 4: policy which limits (for each of the supplier's end users of which query execution module 60 is one) Completed purchases/Total Unique Visits Supplier 5: policy which limits (for each of the supplier's end users of which query execution module 60 is one) Completed purchases/Unique Visitors to booking path Supplier 6: policy which limits (for each of the supplier's end users of which query execution module 60 is one) Unique purchases/Unique Visitors to booking path.

The suppliers may for example include a marketplace for selling unwanted nonrefundable deals e.g. Roomer.com.

Suppliers shown and described herein may be software suppliers of data which may be internal or external. An internal supplier may include a module, service or database that provides information about room pricing and availability. Availability may also be derived from other sources; for example, from hotels' CMS or by crawling other OTA's. For example, expedia.com and booking.com display availability rates in their sites.

Db (database) 50 may be filled by using any suitable external or internal source of information e.g. service level agreements provided by each of the suppliers. It is appreciated that the particular policies described above are merely exemplary of the many possible policies which may be enforced by suppliers.

The server of FIG. 1, shown interacting with a data supplier servers, services or modules, includes a Decomposition Module 10 which is operative to split a user's request, provided by an end-user of the server in FIG. 1, to some or all of the possible splits of that user's request.

Example

A request (say NY, August 1st-5th) enters the Decomposition Module 10 which generates the following splits and stores them in an active request splits database 15:
ALL (no-split option)=August 1st-6th
1,4=August 1st-2nd, August 2nd-6th
2,3=August 1st, 3rd, August 3rd-6th
3,2=August 1st, 4th, August 4th-6th
4,1=August 1st, 5th, August 5th-$6^{th}$.

Typically, database 15 stores a record for each "active" end user request, stamped with the ID of that end user request. These records may be maintained in a cache for all end user requests which are currently active i.e. for which the end user has not yet been given a response. Database 15 records which pertain to an end user request which is no longer active may be deleted or moved to passive or low priority computer memory.

The "all" split is the "trivial" split (aka no-split) which pertains to the same number of nights (5 in this example) as the user's request whereas all other splits such as a 1,4 split or a 3,2 split correspond to 2 or more separate API queries or cached data regarding 2 or more separate time subperiods (shorter time-periods) whose sum equals the number of nights as the user's request e.g. 1+4=5.

The example shows splits that contain two parts (two date ranges that together cover the original request's time range), however the scope of the present invention is not limit to two part splits: the same methods support splits of a time period or time interval into three or more parts. For example, a 10 night stay could be split into 4 or 5 (say) sub-intervals.

The split module 10 may operate in accordance with a predetermined rule on permissible splits e.g. each split is at least 2 nights, no more than 3 API queries per split, or any logical combination thereof such as "a user query of up to 4 nights is split into no more than 2 API queries whereas a user query of 4 or more nights is split into API queries each corresponding to a subperiod of at least 2 nights AND API queries to supplier3 always correspond to a subperiod of at least 3 nights".

It is appreciated that module 10 may use any suitable scheme used to uniquely identify each possible split. For example, a label or Split index may be defined which receives values between 0 (no split) and #nights-1. For example: a 5 night user request may have the following split indices: 0 (full date range—no split),1 (split 1+4),2 (split 2+3),3 (split 3+2),4 (split 4+1).

It is appreciated that the above split index is suitable if the system supports only splits into 2 time intervals e.g. an n-night stay is always split into 2 intervals whose sum is n. If the system also supports splits into more than 2 time intervals e.g. splitting a 10 day stay into three intervals of 3, 3 and 4 days each, any suitable split index scheme may be developed to uniquely mark each possible split.

A Policy Module 20 aka quota vector processor 20 maintains a quota vector having a component for each of the data suppliers. This component indicates the quota of API queries that are currently available (maximal number of API queries or other limitations as stipulated by policy, that may be sent to that supplier) for whichever end user request/s is/are currently active. So, the Policy Module 20 enforces the query limitations of each of the suppliers by ensuring that the next request to come (the upcoming active request) does not exceed these limitations or exceeds these limitations only to a permissible extent, according to predetermined limit exceeding rules. Policy Module 20 is updated about each query sent to any supplier, and updates the quota vector accordingly, by suitably updating to and retrieving from Policy Rules store db 50 and Policy State store db 40 which are now described.

Policy State as stored in db (aka database or data repository) 40 typically includes the current state of each of one or more policy relevant parameters e.g. whichever parameters are predetermined to be relevant for a given data supplier server's policy. For example, if looks per booking are limited in supplier x's policy, separately for each calendar month, db 40 may store how many looks (API queries) have occurred this month, and how many bookings have occurred this month.

Policy Rules db 50 is operative to store a rule or list or set of rules per each supplier. A rule for supplier x may for example be a function of the following format: Supplier_X_Rule(input: Policy State)→output: Quota Typically, the system of FIG. 1 is operative to implement such function per each supplier according to the supplier's policy/SLA using a scripting language or by any other descriptive scheme of describing policy or limitations. In another scenario, this may also be seen as a function of ROI. For example if there is an electronic payment per transaction, then the ROI function may decide the quota according to parameters such as but not limited to average booking commission, location. For example (addressing the policy/SLA case):

Supplier1 has a policy of 75000 queries per hour. the function for supplier1 may be:

```
Supplier_1_Rule( input:   #QueriesSinceHourStarted,
#MinutesSinceHourStarted)   -> outputQuota)
{
  Return output = 75000 / 60 * #MinutesSinceHourStarted –
  #QueriesSinceHourStarted;
}
```

So, if say 24500 queries were already submitted in the course of the first 20 minutes of the current hour, the rule yields that the query extension module in FIG. 1 may send up to 500 queries for the current request since 75000/60*20−24500=500. Or, instead of allowing the query extension module leeway to "finish up" an entire minutes' worth of queries, the rule might be:

```
Supplier_1_Rule( input: #QueriesSinceHourStarted,
#half-MinutesSinceHourStarted) -> outputQuota)
{
  Return  output  =  75000  /  60  *
  #half-MinutesSinceHourStarted  –
  #QueriesSinceHourStarted;
}
```

Another example: Supplier 2 has a L2B ratio policy of 150000 (150000 looks for one booking—checked every calendar month. The function for supp2 might then be:

```
Supplier_2_Rule(          input:
#LookQueriesSinceHourStarted,
#BookQueriesSinceHourStarted) -> outputQuota)
{
   Return     output     =
      #BookQueriesSinceHourStarted    *    150000    –
   #LookQueriesSinceHourStarted;
}
```

So, if say 35999990 API queries or looks have already been submitted, 10 days into the current month, and 240 bookings have been made over those 10 days, the module 60 of FIG. 1 may send up to [240*150000−35999990=10] 10 queries for the active request that module 60 is currently processing.

It is appreciated that the above rule allows the module 60 to use only accumulated surpluses "earned" by virtue of bookings made to date in the current month, and prohibits "going into debt" by sending API queries in excess of the already earned surface. However, the rule may be modified such that at the beginning of the month, or at other times, a predetermined amount of "debt" is permissible e.g. at the beginning of the month, 3 bookings-worth of API queries may be sent on the assumption that this "deficit" or "debt" will be compensated for by the overall number of bookings later in the same month.

An advanced scheme involving prediction may be employed, in order to permit module 60 operation which does not abide by the SLA each given day, but still abides by, or is likely at a given level of confidence to abide by, the SLA per month.

Prediction of the number of bookings that will be made through a given supplier may be made based on the accumulated history showing how many bookings were made through this supplier in previous months.

According to certain embodiments, bookings through a given supplier may be given preference or encouraged or prioritized e.g. by being higher placed in presentations to end users, if there is a danger in the form of a deficit which was permitted but did not cover itself as the month progressed, a danger which is statistically rare. For example, equally attractive options provided by other suppliers for the same end user request may be suppressed and not presented to the end user. Or, querying may terminate once an adequate response from this specific supplier has been found for any given user request during this particular month.

Still referring to FIG. 1, a Query Execution Module 60 executes queries e.g. as described below, typically including deciding which queries should be executed, and in what order.

Example aspects of operation for the server of FIG. 1, some or all of which may be provided, are now described.
a. A request (say request ID=30427, NY, August 1 st-5th) from a particular end user, enters the Decomposition Module 10—which computes all (or some) possible splits thereof and stores in the Active Requests split memory, db 15, e.g. in a file marked with request id 30427.

It is appreciated that an "end user" of the system shown and described in FIG. 1 may be associated e.g. via a computerized system outside the scope of the present invention, to end-users of its own. So, end-users of the system of FIG. 1 may include individuals booking a vacation for themselves, and/or resellers seeking vacations to resell to others. Also, the system of FIG. 1 is itself an end-user of the suppliers 1-n, and the suppliers 1-n may be internal or external suppliers.

Human end users of the system of FIG. 1 may browse a web site associated with the server of FIG. 1. End users may also interact with the server of FIG. 1 through a cell application or over the phone. End users of the system of FIG. 1 may also be business users that provide hotel booking service to their own end user and enlist several suppliers to provide hotel rates. The server of FIG. may serve as one of these suppliers.

b. The quota vector representing, for each data supplier 1-n, the current allowed number of API queries (looks for hotel prices) allotted to the coming request, is available in quote vector processor 20. For example: [Supp1=500,Supp2=10, Supp3=0, supp4=25, supp5=380, supp6=11] means that module 60 may submit (for the coming request) up to 500 API queries to Supplier 1, 10 queries to Supplier 2 no queries to Supplier 3, and so forth.

c. Query Execution Module 60 fetches the current Quota vector from the Policy Module. The current Quota vector is used by module 60 to limit the number of API queries for the current request. For example, if there are 3 suppliers, [Supp1=3,Supp2=1, Supp3=0]—means that the Query Execution Module may submit up to 3 API queries to Supplier 1, 1 API query to Supplier 2 and no API queries to Supplier 3.

d. The Query Execution Module also fetches the possible splits (from the Splits Decomposition module 10) and executes or launches queries on splits selected from among those provided by module 10, where the number of launched queries is limited so as to comply with the SLAs/Policies of the suppliers. Typically, queries are launched in batches whose temporal order defines a sequence of batches where earlier launched batches precede later launched batches occur in the sequence. Each query in a batch is sent via an API or using pre-defined cache data e.g. as provided by HotelBeds.com in their Cache API) to a data supplier server, however queries for which a (still valid) response has been cached earlier, need not necessarily be sent to any data supplier server. Any suitable scheme may be used by the logic of the Query Execution Module 60. For example:

i. module 60 may sort the different split options aka splits provided by module 10, e.g. according to likelihood to retrieve a good deal (e.g. a deal the end user is likely to accept) for each split. The query execution module 60 may compute that likelihood e.g. by applying machine learning to historical data recording previous looks from which the module 60 may derive, that certain categories of splits tend to yield good deals such as splits which include a one-night long time period, splits from specific suppliers, and so forth. Then, the module 60 may send a suitable number of the top-ranking splits provided by module 10, until the quota vector from processor 20 is empty for this current request.

Alternatively or in addition, all other things being equal, queries which bring at least one specific aspect e.g. policy parameter closer to the data supplier policy-defined limit to a lesser degree, may be assigned by module 60 to an earlier launched batch, whereas queries which bring at least one specific aspect e.g. policy parameter closer to the data supplier policy-defined limit to a greater degree, are assigned to a later batch. Module 60 may sort the different split options aka splits provide by module 10, e.g. such that all other things being equal, queries requiring few interactions with data supplier servers such as queries pertaining to splits into 2 sub-intervals are prioritized over queries requiring many interactions with the data supplier servers, such as queries pertaining to splits into 5 sub-internals. Alternatively or in addition, module 60 may sort the different split options aka splits provide by module 10, e.g. such that all other things being equal, queries for which all or some information is available in the cache 70 are prioritized over queries requiring many interactions with the data supplier servers because few or none of the queries required for a particular split, have responses stored in cache 70.

ii. module 60 may launch queries either in parallel or serially or in batches i.e. serial batches wherein all API queries within a given batch (set of queries) are sent in parallel. When serially launching batches or queries, the result returned to module 60 by the relevant supplier/s may determine whether or not to stop. If the deal is good enough as per predetermined "saves enough" stopping logic, launching of API queries may stop; otherwise, launching API queries may continue until stopped by virtue of exhaustion of (zeroing of e.g.) all or all relevant components of the quota vector—since the quote vector functions as an "avoid data supplier policy-defined limit" stopping criterion.

An example of "saves enough" stopping logic is that no more API queries are launched, once a split has been found that saves at least 25 dollars or 25% relative to the optimal API query response given for the trivial "all" split generated by module 10 of the split vacation deal server of FIG. 1.

It is appreciated that any suitable "saves enough" stopping criterion may be employed. For split deals for which only premium and expensive rooms (while the request is for low cost room) are left or there is no "all nights" option (e.g. a 160 dollar deal has been found for 1-2 August and a 102 dollar deal has been found for 3-5 August but none for 1-5 August in that area) the stopping criteria may for example include comparing the numerical value of the total cost (160+102=262 dollars) to a predetermined "sanity check" default numerical value, or the total cost may be compared to a default numerical value based on historical data from the same hotel.

It is appreciated that the "saves enough" stopping criterion need not be applied to each and every end user request; optionally, no "saves enough" stopping criterion is applied to some end user requests e.g. if it is desired to find an even better deal or if it is desired to increase a hotel inventory associated with the server of FIG. 1. For example, a counter may be operative to count the number of hotels available so far, based on batches already processed, and unless a some predefined threshold (say—at least 50 hotels available on screen for the user's request) has been achieved, there is no stopping, and instead launching additional batches is continued.

iii. module 60 may save some or all of the queries it launches, e.g. in a API query cache 70 that stores data supplier responses to previous looks. Cache 70 may store records each comprising some or all of: cost quote, supplier, location/hotel name, time interval, date or expiry if known of query, ID of end user request, ID of split within end user request. For example a record in cache 70 may be: 600 usd, supp4, NYC, 1-4 August, 30 October, and optionally 30427, $3^{rd}$ split to indicate that a 600 dollar stay is available in New York city from 1-4 August, and this offer, which expires 30 October, was obtained by module 60 from supplier 4 for the $3^{rd}$ split generated by module 10, for end user request 30427.

Module 60 may omit saving some of the query results, e.g. due to space limitations or if a query is relatively unlikely to repeat within the date range where the cached result would still be relevant or if the cache already contains that result from earlier requests, and the request was sent in order to validate the cache being recent enough to be still valid.

As each query is launched (sent from the Query Execution Module to the suppliers), module 60 updates the Policy State store 40, and Policy Module 20 updates its Quota vector accordingly, for the next request to be processed by module 60.

Module 60 typically processes plural user requests in parallel e.g. while waiting for a batch of API queries to return from various suppliers, module 60 may take up a next end-user request waiting in module 10 or a pending e.g. still active request already partially processed by module 60. Any suitable prioritization scheme may be used to determine the order in which module 60 processes end user request e.g. partially processed requests take precedence over new requests arriving from module 10, first come first served, regardless of whether the waiting end user request is new from module 10, or is an already partially processed request, last come first served, etc.

iv. Typically, the size of the batches is determined in a manner which balances at least the considerations of: refraining from too-high (in terms of user satisfaction) response time (between accepting user query and providing response thereto) due to over-small batch size causing too long a sequence of batches thereby adversely affecting response time vs. refraining from un-necessarily early reaching of the "avoid data supplier policy-defined limit" stopping criterion due to over-large batch size. It is possible that the server does not perform all split requests from a specific supplier; instead the server may for example obtain one sub-interval of time from supplier X and another sub-interval of time from supplier Y (e.g. two nights from x, followed by 3 nights from y).

v. Typically, module 60 or a composition module (not shown) generates user request response/s comprising at least one offer for a vacation deal for the time period stipulated in the user request, which is then provided to the relevant end-user. The offer is generated by combining responses from among those received to the queries launched by module 60 (or those available in cache 70). For example, when all splits of a certain user's request have been queried; and/or when module 60 has terminated sending of batches for this user request, combining may include computing the total sum of each sub-period's cost (as known from the cache 70 or from the relevant API query) for each split, then providing all of these possible offers to the end user or providing only those ranked highest from among all possible offers, using a predetermined ranking e.g. simply by cost.

For example, a 10 day vacation may have many possible splits, into sub-intervals whose lengths may range from 1 to 9 days. Some splits may include two sub-intervals whose total length is 10 days; other splits may even include 10 sub-intervals each 1 night long. Some or all of these now have known costs, whether from cache 70 or from the relevant API query. Perhaps 17 of these possible splits (say) were launched as queries (or accessed from the cache) before stopping criteria were reached and batch-launching was terminated. For each of the 17, the costs of each sub-interval in the split may be summed to obtain a total cost for the 10 day vacation. Perhaps the 17 possible splits have the following total costs, in dollars: 800, 810, 810, 810, 500, 1500, 1505, 1600, 1666, 1999, 499, 505, 1400, 1400, 1430, 999, 950. So, all 17 deals with the above costs may be presented to the end-user who sent in the request, or perhaps only the top 5 (say) deals may be present to the end-user, e.g. those whose costs are 500, 499, 505, 999, 950. Typically, the end-user is then prompted to provide an acceptance message to the split vacation deal server of FIG. 1, indicating that s/he accepts one of the presented deals. If the end-user obliges, typically, the user request response is corroborated by the module 60 e.g. by sending a query corresponding to any response provided by cache 70 (unless, perhaps, that response is known to be valid due to a cached expiry date not yet reached) rather than via a fresh API query. For example, let us say the user accepts the 999 dollar deal, which includes 5 sub-intervals of 2 nights each in hotels managed by suppliers 2, 3, 2, 1, 6 respectively. Of these 5, the first two were freshly queried, the third and fourth (from suppliers 2, 1 respectively) are known to be valid since suppliers 1, 2 always indicate expiry date which is stored in cache 70 and for both, the expiry date has not yet arrived. However the last sub-interval, pertaining to the last 2 nights from among the 10 which are to be supplied by supplier 6, was calculated based on cached data which has an old expiry date or no expiry date. In this case, module 60 may corroborate the cost of the last 2 nights by sending an API query to supplier 6 regarding the cost of the last 2 nights. It is appreciated that each data supplier typically has an ID in the server of FIG. 1, and each stored record in cache 70 typically includes the ID of the relevant data supplier.

It is appreciated that the specific payment scheme for deals automatically generated by the server of FIG. 1, whether pre-paid or post-paid, is outside of the scope of the invention. A particular deal may even be partially post-paid and partially pre-paid e.g. in a split 5 day vacation in which the first 2 days happen to be a pre-paid deal offered by supp3 whereas the second 3 days happen to be a post-paid deal offered by supp4.

According to certain embodiments, "save enough" stopping criteria change over time. For example, initially as soon as the server finds a split into sub-intervals for a given user request with a given time period, that is at least minimally better (e.g. cheaper) than the non-split trivial option, no more API queries are launched. Later, when the system is more mature and has more cached data at its disposal, the stopping criteria becomes more strict since this is possible without exceeding look to book or other supplier policies, by virtue of the increased ability to utilize cached data.

Saving in a split deal may also be the result of a combination of currency changes—for example the first portion of the split coming from a supplier that charges in USD and the second portion of the split coming from a supplier that charges in GBP. Alternatively or in addition, one portion of the split (aka one sub-interval included in the time interval of the end user request) may be pre-paid and another sub-interval may be post-paid—allowing flexibility to reduce the total deal price. Alternatively or in addition, in some cases it may be beneficial to offer a split deal even in there is no saving when compared to the full date range—e.g. (1) there is another OTA in a price comparison which provides a more expensive deal (2) the service would like to increase its inventory, therefore provides all hotels that are possible, even if there is no saving.

It is appreciated that the scope of the present invention in general and module 60 in particular, is not intended to be limited to the particular embodiments described herein. For example, in addition to or instead of the logic described herein, any or all of the following rules may be provided:
a. rule—module 60 does not send queries on behalf of end-user George Smith's request if module 60 may compile, using the cache, a split that's cheaper (or x % cheaper) than the "whole" quote for George Smith's trip b. rule—module 60 does not send further queries on behalf of end-user George Smith's request if module 60 may compile, using the queries module 60 has already done for Smith, a split that's cheaper (or x % cheaper) than the no-split quote for George Smith's trip
c. rule: given certain splits in the cache 70 which are relevant to George Smith, module 60 prioritizes completion queries i.e. end-user George Smith's request is for 2-6 June and cache 70 has data re 2-3 June sub-period so the module 60, all other things being equal, or always, prioritizes a query re 4-5 June over queries for a 2-5 June plus 6 June split.
d. rule: prioritize queries pertaining to short sub-intervals over queries pertaining to longer time intervals since shorter sub-intervals are likely to be relevant for more different user requests, than are longer sub-intervals.

FIG. 2 is a simplified flow diagram of an example method of operation for the system of FIG. 1 for each end user request from among a plurality e.g. stream of end user requests, however it is appreciated that alternatively, other methods of operation may be employed e.g. as shown and described herein. The method of FIG. 2 includes the following operations, suitably ordered e.g. as shown:

Operation 100. a deal request from end user, including end user request properties e.g. time-interval inter alia, is sent e.g. via a data network to Decomposition Module 10.

Operation 110: Module 10 uses a processor to compute all (or some) possible splits of the request's time interval and stores results in the Active Requests split memory, db 15, e.g. in a file marked with request id.

Operation 120: quota vector representing, for each supplier, the allowed number of API queries (of looks for hotel prices) allotted to the upcoming/current request, is maintained in quote vector processor 20 which compares policy state stored in db 40 to policy rules stored in db 50, for each supplier, where policy states are zeroed at suitable times e.g. at beginning of calendar month for policy rules that limit a parameter per calendar month Operation 130. Query Execution Module 60 fetches the current Quota vector from the Policy Module/processor 20 and fetches possible splits from Splits Decomposition module 10

Operation 140. Query Execution Module 60 generates a sequence of batch/es of queries by prioritizing splits fetched from module 10 using any suitable prioritization scheme Operation 150: Query Execution Module 60 executes batch/es of queries generated in operation 140, batch by batch, in order, where less than all possible queries are typically executed since the number of launched queries is limited so as to comply with the SLAs/Policies of the suppliers as per current quota vector, for each relevant supplier) and/or launched queries are terminated once responses to the queries are deemed to "save enough". Each query in a batch may be sent e.g. via an API to a data supplier server, however queries for which a (still valid) response has been cached earlier in cache 70, need not be sent to any data supplier server.

Operation 160: Query Execution Module 60 responds to end user by presenting one or more deals satisfying the time-interval and other end user request properties. A Deal presented to a user may be a combination e.g. concatenation or set of query responses executed in operation 150, re sub-intervals of the interval requested by the end user and may include cached responses.

Operation 170: query execution module 60 increments the current policy state as stored in policy state db 40 to reflect queries sent in operation 150.

It is appreciated that the systems and methods shown and described herein e.g. the system of FIG. 1 and the method of FIG. 2 (and of FIG. 3, presented below), may employ any suitable scheme for reducing the number of API queries which need to be launched per query or per Q number of queries or per day/month/year of operation in order to function adequately. Various API query reduction schemes a, b, c, . . . are now described by way of example which may be provided separately or in any suitable combination. Specifically re FIG. 1, these API query reduction schemes may be implemented, say, by the query execution module 60 or by any other suitable processor governing the operation of query execution module 60.

The API query reduction scheme a includes sending API queries for all possible splits—e.g. if there is no look-to-book policy for certain suppliers. Typically, per each request from an end user for a hotel booking (for example defined by date range+city), module 60 may go over all possible permutations generated by module 10. For example: for a booking that is for January 17 till January 22 (5 nights) module 10 may create the following splits:

January 17 till January 18+January 18 till January 22//2 API queries
January 17 till January 19+January 19 till January 22//2 API queries
January 17 till January 20+January 20 till January 22//2 API queries
January 17 till January 21+January 21 till January 22//2 API queries
January 17 till January 22 (for comparing between the above splits and the original request)//1 API query.

In total 4 different covers (aka splits) each contains 2 API queries for price quotes, PLUS one API query for the original booking (no split method)—summing up to 9 API queries for the case of the above 5 nights booking. System may store the results of the price quote API queries in API query cache 70. An API query for the full date range (as stipulated in the original end user request with no splits) is not mandatory since alternatively, it is possible to compose split based deals without the response of that request. However the full data range API query may be useful for serving as a basis of comparison in order to evaluate the saving yielded by splitting; alternatively or in addition this saving may be estimated from statistics on previous similar requests according to predetermined criteria for similarity.

API query reduction scheme b includes random sampling for selection of API queries to be launched to obtain only a subset of the possible API queries, e.g. selecting some splits from among those generated or those which could be generated, for the original booking request, e.g. using random selection. Random selection might cause the server to "miss" the best deal, but the probability is still good that the server of FIG. 1 will find a split that saves comparing to the original non-split request. This scheme may be employed globally or only for a certain city or season e.g. depending on prior knowledge re how high the probability is for various cities and seasons. The data structure of API query reduction scheme A may be used for scheme b as well. API query reduction scheme c includes launching some or all possible API queries for only some end user requests rather than for all end user requests e.g. only for a random sample of end user requests. Caching then becomes useful since repeating requests may be expected to occur between user requests.

The fields for a key used to access cache 70 may include the date range (of the split query) and city or the hotel, guest combination (2+2 children for example). Cached results may be useful even for non-identical user requests which pertain to a single city/location and have an overlapping sub-interval of time. For example, the first user wants a deal for January 3-8 so the server of FIG. 1 may send API queries for the following sub-intervals: 3-4, 3-5, 3-6, 3-7, 3-8, 4-8, 5-8, 6-8, 7-8. Now a second end user sends a user request for January 6-10. The server of FIG. 1 need not query for all of the following subintervals 6-7, 6-8, 6-9, 6-10, 7-10, 8-10, 9-10 since data re sub-interval 6-8 was cached while processing the previous request. If another end user asks for 3-10, then the server of FIG. 1 may already have data for many relevant split options readily available in cache 70.

—Typically, when the user agrees to (sends a confirmation message accepting) a deal, the server of FIG. is programmed to launch a API query to augment each relevant cache based response. Should there be a difference, the server of FIG. 1 might tell the user that the price has been modified and seek re-confirmation of user approval.

The system may "profile" end users and separately sample each profile. Size of the sample may be increased dynamically until it is seen that the cache miss ratio (e.g. the proportion or fraction of accesses to the cache that are a miss) is no longer changing.

A suitable key may be used to access a suitable cache data structure e.g. a key which may include some or all of the following API query parameters: Date Range+City (or hotel ids)+guests combinations (adults/children)+supplier.

It is appreciated that API query reduction scheme B involves the server of FIG. 1 sample among all possible split requests for a given end user, and in API query reduction scheme C the server of FIG. 1 may ask for all possible splits—only for a sample of the end users. Alternatively, the schemes b, c may be combined e.g. randomly sample the end users (i.e. the requests sent thereby) and randomly sample which queries to launch, for those end users in the sample.

In API query reduction schemes a, b, c, all API queries may be launched in parallel to reduce response time for the end user who is waiting online for her or his price quote. Yet, if the API of price quotes is fast enough, using any suitable UI metric or threshold the server of FIG. 1 may send an initial batch of API queries, and then, should the results not be good enough e.g. not save enough e.g., say, saving less than $25 or 5% relative to the best non-split deal, the server of FIG. 1 may launch another batch of API queries, and another, and so forth, only if both needed and possible using predetermined stopping criteria e.g. as shown and described herein.

The process may also be stopped by action initiated by an end user who originated the request e.g. selecting a deal, asking for results in another page (in a system that supports paging) or even closing the link to the server. In addition, the process may be re-continued by the user asking for "additional deals", according to certain embodiments.

The server of FIG. 1 may analyze the benefit of increasing batch size and determine batch size accordingly. For example—for 1 random split the server of FIG. 1 may be found to save on average 6%. For 2 splits the server of FIG. 1 save on average 17%. For 3 splits the server of FIG. 1 save on average 17.3% so the server of FIG. 1 may stop at 2 splits. Generally, each batch adds a fixed amount of time to the total amount of time that the end-user is waiting. Added waiting time detracts from the user experience (and from the efficiency of the website's performance) hence more batches are only justified if they save significantly more than a few batches. In the above example, using 2 splits instead of one adds 17−6=11% whereas using 3 splits instead of 2 adds only 17.3−17=0.3%.

Data structure for scheme c may include a set of the data structures used in schemes A or B, grouped into batches of API queries. Any suitable rule/s may be employed to allow the server of FIG. 1 decide which API queries should be included in the first batch as opposed to subsequent batches, such as but not limited to:

1. Random selection of API queries to be included in the first batch as opposed to subsequent batches
2. Machine learning or regression applied to historical statistics of API queries to determine categories of queries that have high probability to gain high saving; these may be assigned to the first or an early batch. Specifically, features of API queries such as but not limited to some or all of: (arrival date, number of nights, city, day of week, number of days between request time and arrival time (for example—requested arrival date is August $20^{th}$ and the actual search is being conducted on August $5^{th}$—so the date difference is 15 days) and label (aka split index) may be pushed into a classification algorithm (for example SVM (Support vector machine), C5) and identify instances of "good" splits e.g. which saved over a threshold amount. API queries to be included in the first batch are then those API queries which, according to machine learning results, have high probability to gain high saving.

The API query reduction scheme d includes Serial/Semi Parallel execution of queries—until a split that saves a predefined amount has been achieved. The server of FIG. 1 does not send all API queries in parallel—and the scan of split queries e.g. for inclusion into launched batches of API queries terminates before all possible splits have been queried, e.g. once a desired stopping criterion has been achieved. It is appreciated that in the worst case, exactly the same queries are sent, as would have been sent, were all possible queries to be sent in parallel. The only difference is the time which elapses until the user sees a response e.g. until all deals that have been identified appear on the screen. Any suitable stopping criterion may be used e.g. that a split is "good enough to justifying stopping" if that split saves at least $25 or 5%. Or, statistics regarding accepted deals may be used to generate a stopping criterion. For example, the n'th e.g. 99th percentile of savings, computed over all deals that were actually booked, may be used as a stopping criterion. If for example, 100 deals or 100 thousand deals have been booked thus far, and some, most, almost all (e.g. 99%) or all (100%) of them have involved a saving of at least 2.8%, then a split may be deemed "good enough to justifying stopping" if that split saves at least 2.8%.

The API query reduction scheme e includes filter selection (aka "assigning API queries to batches" or API prioritization) by selected brands—e.g. filtering possible API queries to limit only to selected hotel brands predetermined e.g. learned previously. For example, the server may maintain statistics regarding the probability that a given hotel yields a saving if the stay in that hotel is split vs. not split, Next, a parameter K1 may optionally be defined by the limits of the query for pricing service API. Then, a hotel table, in which each record stores a hotel ID and the above statistic (probability of yielding a saving), is sorted by the above statistic. Requests from end users are then split only if their request can be fulfilled, or alternatively must be fulfilled, using a hotel included in the top K hotels in the sorted hotel table. Alternatively, all requests from end users are split unless their request can be fulfilled, or alternatively must be fulfilled, using a hotel included in the bottom K2 hotels in the sorted hotel table.

More generally, the decision on whether or not to split a given user request, and how many and/or which splits to query, may depend on accumulated statistics regarding past queries to hotels relevant to that given user request. Hotels or hotel brands are ranked by how frequently they have thus far been "amenable to splits" using any suitable criterion for amenability e.g. that a split reduced cost by at least (say) 25 dollars or 5%, or that a split deal from this hotel was eventually accepted by an end user (in general, or by an end user of a particular profile similar to the profile of a current end user) in preference over a non-split deal from the same hotel. Then, the server may treat different hotels differently depending on their amenability e.g. may prioritize hotels which are more amenable to splits when selecting hotels responsive to user requests, or may apply more splits to hotel/brands which are more amenable to splits, than to hotels/brands less amenable to splits.

Even more generally, the decision on whether or not to split a given user request, and how many and/or which splits to query, may depend on accumulated statistics regarding any attribute or combination of attributes of the hotel and/or hotel brand and/or of the user. For example, analysis of accumulated statistics regarding past queries to hotels may yield that for 5 night stays in hotel chain X, 1-4 splits rarely or never yield "good enough" savings, so the server may generate a rule that 1-4 splits for hotel chain x are not queried. Each such rule may expire after a predetermined time in recognition of the fact that hotel costing schemes vary somewhat over time. The time of expiration may itself be dynamic and may for example have a default value for all rules and all hotels (say, 3 months) but may have a different value for certain hotels or other attributes.

According to certain embodiments, then, brands or external service providers are ranked by the probability to obtain a reduced deal cost or to create a new deal for a split relative to the non-split total time interval stipulated by the end-user for the deal. API queries for sub-intervals of a user's request may not be directed to low-ranking external service providers at all. Or, API queries for sub-intervals of a user's request may be directed to low-ranking external service providers only in late batches. Or, the server of FIG. 1 may still allow a suitable proportion of API queries to be sent to low-ranking hotels, where the proportion is small enough to ensure the server of FIG. 1 complies with relevant policies e.g. look to book ratio. For example, according to certain embodiments, a data structure e.g. table is provided in a cache or other computer memory to hold a black/white list of hotel brands that are to be filtered. According to one embodiment, the black/white list includes a binary split (white)/do not split (black) variable which is stored for each hotel or brand. According to one embodiment, a certain proportion of the binary variables (say, for 10% or 20% or 30% or any other suitable proportion of hotels in the list), which may be randomly selected, are determined to be black or white randomly rather than by virtue of accumulated data—to allow the list to be automatically refreshed.

Typically, some API queries are scheduled which are intended, solely or inter alia, to determine whether rankings of external service providers are still in force, since it is possible that a low ranking service provider has since improved in terms of the probability of obtaining savings therefrom using splits, and/or it is possible that a high ranking service provider has since deteriorated in terms of the probability of obtaining savings therefrom using splits.

Turning now to API query reduction scheme g, filtering need not be only as a function of hotel or hotel brand or external service supplier ID as described above. Any other attribute of the end user or her or his request may be used as a basis for filtering. For example, specific days of the week may be filtered out and deemed "black" i.e. a rule may operate in the server which stipulates that deals including or starting from these days, are not split.

These rules are typically based on accumulated big data indicating day of the week which correlate with a high probability of gaining a cost saving by splitting. The criterion may be based on days of the week which more frequently yield a saving of at least x magnitude as opposed to other days of the week which less frequently yield a saving of at least x magnitude and/or the criterion may be based on days of the week for which the expected value of the saving gained by splitting, relative to not splitting, is largest, relative to other days of the week for which the expected value of the saving gained by splitting, relative to not splitting, is smaller.

Rules described herein may be represented in memory in any suitable manner. For example, these rules may be represented in memory using a key-value table:
Key: [DayOfWeek, #nights] Value: [Split Index], where the split index is a unique identifier stipulating the specific split (division) to be queried.

Other Examples

Key: [Days before arrival, #nights] Value: [Split Index],
Key: [Days before event, DayOfWeek, #nights] Value: [Split Index],
These rules may be created manually, or may be computed automatically.

One method to generate such rules is to collect a log of price quotes of all possible splits in a suitable predetermined format such as the following example format:
[City, Date Of Request, Date of Arrival, #nights, Split Index, Original Price, Split Price]
For example: for a user request pertaining to a 5 night stay, there may be 5 different entries in the log with the following split indices: 0 (full date range—no split),1 (split 1+4),2 (split 2+3),3 (split 3+2),4 (split 4+1).

The server of FIG. 1 may filter that log to isolate only cases where the price difference between the original (full range—no split) price and the split-price is above some threshold T, or when there is a saving of over K %, or both or either ("and" or "or" logical combination respectively).

Then the server of FIG. 1 may use this log as an input for a classifier (example: SVM, C5.0 etc) where the label for the classifier is the split index. Per each weekday, the classifier may determine which is the best possible split. An output of the classifier may include a tree of other representation of a model generated by the classifier.

For example, a graph computed on 6 months' worth of data pertaining to hotels in New York city (say) may yield that for a 5 night stay that begins on Tuesday, the 4-1 split (split index=4) saves 10% on average, whereas the 2-3 split (split index=2) saves only 1% on average.

According to certain embodiments, a key-value store data structure (for performance) or a database is provided where the key is the day of the week (total of 7 keys) and the value is a list of the splits ordered by the savings historically achieved for splits beginning with, ending with or including each specific day of the week API query reduction scheme h includes Filter selection by days close to events, e.g. by the temporal distance of a particular end user request for a particular city or area, to an event in that area, such as conferences or festivals.

The server of FIG. 1 may collect a list of events likely to affect the prices of bookings in their area in the temporal vicinity of that event per each city/location. For each event, some or all of the following may be collected: [Event Name, Location (e.g. Latitude/Longitude or name of city or state or country or zip code or telephone area code), Date Range]. This list may be collected manually and/or automatically. For example, known online lists provide updates about events such as the data at the following http://www addresses:
ieee.org/conferences_events/conferences/search/index.html?KEYWORDS=&CONF_SRCH_RDO=conf_date&RANGE_FROM_DATE=&RANGE_TO_DATE=®ION=ALL&COUN TRY=ALL&RowsPerPage=10& PageLinkNum=10&ActivePage=1&SORTORDER=desc& SORT FIELD=start_date or: conferencealerts.com/country-listing?country=United+States+of+America.

The server may learn rules about pricing in the geographic vicinity of such events and prevent the system from querying for price quotes unlikely to yield savings, relative to requests not pertaining to event "peaks". In order to learn such rules data may be collected by some or all of:
a. identifying peaking prices in specific locations, and
b. these trends or peaks may then be correlated, where possible, to a known e.g. annual or pre-advertised conference or event whose location and date both match the identified peaks.

In order to identify price trends (operation a above) the server may:
(a1) mark all hotels whose accumulated price quotes indicate a substantial rise in price over a short period of time such as a few days or weeks
(a2) run a clustering algorithm on the locations of such hotels, limiting the cluster growth to no more than a given radius (e.g. 500 meters or a few km).
(a3) identify in the output of operation a2, only those clusters that include more than a predetermined number N of hotels, thereby to yield zones (each having a radius of up to 500 m) whose hotels have temporarily upped their prices significantly.
(a4) for each cluster identified in a3, store the relevant date and location.

Alternatively or in addition it is possible to directly "confirm" events—e.g.
i. Query hotels as usual
ii. Graph the rates "sampled" for each hotel over the month/year.
iii. Identify peak rates at certain times such as 10-12 December and 14-18 April.
iv. Next year the server may know that in these hotels there are probably peak rates between 10-12 December and 14-18 April.
E. If it is found that all sampled hotels in a region have a certain peak, that peak may be marked (e.g. 10-12 December) as an "event" in all hotels in that region, even those events which the user did not manage to sample.

A time series algorithm may be used to identify such time based pricing patterns. However, an advantage of "matching" peaks to actual events, is that many events, like conferences and even holidays (e.g. those falling on the first Monday of a certain month or Moslem or Jewish holidays) do not repeat on the same date each year.

API query reduction scheme I includes Filter selection by geographical area of hotel—same as previous scheme h, but now depending on defined geographical areas that are likely to increase the look-to-book ratio. Here the server of FIG. 1 first creates a binary map of areas where the method of operation described herein has been successful in yielding save-enough options relative to non-split options, vs. areas where the method of operation described herein has not been successful in yielding save-enough options relative to non-split options. Then the server of FIG. 1 may filter the requests to include only the former category of areas. A geo-index db may be used to identify areas such as but not limited to MongoDB.

For example, each query or booking may be stored, by the server of FIG. 1 in a db. Each record in the db may include: [query date, query location (lat,long), query type (look/book)]. When a new user request arrives whose [lat,long] is 30,35—the server of FIG. 1 queries the DB either live (aka fresh) or via caching, for all records of time [Now-X hours till Now] within some radius (500 m) of the location 30,35 e.g. using conventional geo-index functionality provided by the database. Example: the server of FIG. 1 received 50 records for the 30,35 location plus/minus 500 meters. Of these 10 records were book queries and 40 are look queries (for which no booking was later made)—so the estimated look2book ratio is 0.25 for the 30,35 location. The server of FIG. 1 may have a threshold for the look-to-book ratio to determine whether or not to operate the method of FIG. 1 for end user requests pertaining to the 30,35 location plus/minus 500 meters. If the threshold is at least 0.3, the system may decide not to split end user requests pertaining to the 30,35 location plus/minus 500 meters.

API query reduction scheme j includes filter selection by most-likely-to-succeed range splitting index, so as to prefer splitting indices most likely to beat the look-to-book ratio (or other relevant data supplier policy). For example, machine learning may yield the finding that for 6-night long end user requests (in general or for specific locations, specific date ranges, specific initial day of week etc.), the split "most likely to succeed" is 5 nights followed by 1 night. The term "filter selection", here and elsewhere, is intended to include performing only a subset of API queries identified by the filter, or prioritizing (to an early batch) the subset of API queries identified by the filter, relative to API queries not in the subset of API queries identified by the filter.

API query reduction scheme k includes any filter selection by using a conventional machine learning classifier for choosing the splits that are likely to yield better performance (price differences/savings). This is a generalization of API query reduction scheme G, which does this for a specific feature (day of week); alternatively or in addition other features may be used for the classifier such as but not limited to location of hotel, time difference between dates of stay to major event in this location, and number of recent requests for that location (e.g. number of requests for that location over the last hour). It is appreciated that the schemes described above may be used in isolation or may be suitably combined. For example, more than one criteria may be used for filtering rather than filtering by only one criterion as per schemes e—k above.

The term "application programming interface" or API is intended to include any set of routine definition/s and/or protocols and/or any expression of a software component's operation/s and/or input/s and/or output/s, and/or underlying type/s, which facilitate automated interaction between software components e.g. microservice. For example, a software service which accepts user requests as input and provides responses as output may accept this input from, and/or provide this output to, another software component, on another server or even the same server, via an API. The API may even be a protocol governing use of a database accessible by both of the two servers or a protocol governing (a) generation of data file/s having a protocol-determined structure by the software service and (b) accessing of the data file by the software component, and vice versa: generation of data file/s having a protocol-determined structure by the software component and (b) accessing of the data file by the software service The term "external server" is intended to include a server which is "external" to another server in the sense that the two servers communicate via a data communication network rather than being topologically co-located in the network. The term "server" used herein may include any portion of a server or any cooperating plurality of servers.

FIG. 3 is a method which may be performed by a server, aka split vacation deal generating server, including at least one processor, which may or may not comprise the server of FIG. 1, for at least one user's request provided to the split vacation deal server by at least one end-user and requesting an offer for a vacation deal including stipulating a vacation time period. It is appreciated that various operations in FIG. 3 may be mix-and-matched with various operations of FIG. 2. The method of FIG. 3 may include some or all of the following operations, suitably ordered e.g. as shown;

Operation 310: sending queries in plural batches in series, thereby to define a sequence of batches sent one after another rather than in parallel, each batch including at least one query and wherein at least one query pertains to at least one possible split of the end-user's stipulated time period into shorter time periods and wherein at least one batch is sent, via at least one API, to at least one data supplier server having at least one policy limiting at least one current aspect of the at least one data supplier server's interaction with the split vacation deal server;

Operation 320: storing at least one response, received via at least one API from at least one specific data supplier server, as a record in a cache, the record including a cost, a time period to which the cost applies, and an ID of the specific data supplier server, and incrementing monitoring data quantifying at least the specific current aspect of the at least one data supplier server's interaction with the split vacation deal server; and Operation 330: after sending at least one individual batch from among the batches terminating sending of batches if a predetermined logical combination of at least the following two stopping criteria a, b, computed by the processor, is met:

a. at least one "saves enough" stopping criterion is met by at least one individual numerical value of at least one individual response from among responses received to the queries, compared to at least one default numerical value; and b. at least one stored "avoid data supplier policy-defined limit" stopping criterion reflecting at least one limit defined by a policy for at least one specific aspect of the at least one data supplier server's interaction with the split vacation deal server has been reached by monitoring data quantifying at least the specific aspect of the at least one data supplier server's interaction with the split vacation deal server;

and otherwise, if the predetermined logical combination of at least the stopping criteria a, b is not met, sending at least one more batch from among the plural batches, Operation 340: generating at least one user request response, comprising an offer for a vacation deal for the time period, to the at least one end-user by combining at least two responses from among responses received to the queries into a single user request response and sending the at least one user request response to the at least one end-user, when at least one of the following occurrences has transpired: 1. all splits of the user's request have been queried; and/or 2. sending of batches has terminated because the predetermined logical combination of at least stopping criteria a, b has been met.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A method performed by a split vacation deal generating server including at least one processor, the method comprising:

for at least one user's request provided to the split vacation deal server by at least one end-user, requesting an offer for a vacation deal including stipulating a vacation time period:
- i. sending a sequence of batches of queries, wherein the batches are sent one after another rather than in parallel, each batch including at least one query and wherein at least one query included in at least one of the batches pertains to at least one possible split of the end-user's stipulated time period into shorter time periods and wherein at least one batch, which includes said query, is sent, via at least one API, to at least one data supplier server having at least one policy limiting at least one current aspect of the at least one data supplier server's interaction with the split vacation deal server;
- ii. storing at least one response, received via at least one API from at least one specific data supplier server, as a record in a cache, the record including a cost, a time period to which the cost applies, and an ID of the specific data supplier server, and incrementing monitoring data quantifying at least a specific parameter currently characterizing the at least one data supplier server's interaction with the split vacation deal server;
- iii. after sending at least one individual batch from among said batches:
  terminating sending of batches if a predetermined logical combination of at least the following two stopping criteria a, b, computed by said processor, is met:
  a. at least one stopping criterion (aka "saves enough" stopping criterion) is met by at least one individual numerical value of at least one individual response from among responses received to said queries, because said at least one individual numerical value saves enough, compared to at least one default numerical value, according to said "saves enough" stopping criterion; and
  b. at least one stored "avoid data supplier policy-defined limit" stopping criterion reflecting at least one limit defined by a policy for at least one specific aspect of the at least one data supplier server's interaction with the split vacation deal server has been reached by monitoring data quantifying at least said specific parameter currently characterizing the at least one data supplier server's interaction with the split vacation deal server;
  and otherwise, if the predetermined logical combination of at least said stopping criteria a, b is not met, sending at least one more batch from among said plural batches, and
- iv. generating at least one user request response, comprising an offer for a vacation deal for said time period, to said at least one end-user by combining at least two responses from among responses received to said queries into a single user request response and sending said at least one user request response to said at least one end-user, when at least one of the following has occurred:
  1. all splits of said user's request have been queried; and/or
  2. sending of batches has terminated because the predetermined logical combination of at least stopping criteria a, b has been met.

2. The method according to claim 1, further comprising:
- v. for at least one individual user request response generated by said combining, for which the end-user has provided an acceptance message to the split vacation deal server and for which at least one of said at least two responses was provided by said cache rather than by an external supplier, corroborating said individual user request response by sending at least one query corresponding to said at least one response provided by said cache and including a specific external supplier's ID, via an API to the data supplier identified by said ID.

3. The method according to claim 1, wherein at least some queries corresponding to at least some splits are sent to the internal cache and if responses to at least some of said queries are available in the cache, at least some of said queries are not sent to any data supplier server.

4. The method according to claim 1, further comprising providing a computer-implemented "policy rules" repository storing "avoid data supplier policy-defined limit" stopping criteria per data supplier.

5. The method according to claim 1, wherein said "avoid data supplier policy-defined limit" stopping criterion comprises, for at least one data supplier, a look-to-book limit.

6. The method according to claim 1, wherein said "avoid data supplier policy-defined limit" stopping criterion comprises, for at least one data supplier, a limit on number of queries sent by the a split vacation deal server to the data supplier server per unit time.

7. The method according to claim 1, wherein said batches are ordered such that all other things being equal, queries which bring said at least one specific parameter closer to the data supplier policy-defined limit to a lesser degree are assigned to an earlier batch, whereas queries which bring said at least one specific parameter closer to the data supplier policy-defined limit to a greater degree, are assigned to a later batch.

8. The method according to claim 1, wherein said terminating comprises terminating sending of batches if either of at least said stopping criteria a, b are met and if neither of stopping criteria a, b are met, sending at least one more batch from among said plural batches.

9. A computer program product, comprising a non-transitory tangible computer readable medium having computer readable program code embodied therein, said computer readable program code adapted to be executed to implement a method performed by a split vacation deal generating server including a processor, the method comprising:

for a user's request provided to the split vacation deal server by a end-user, requesting an offer for a vacation deal including stipulating a vacation time period:
- i. sending a sequence of batches of queries, wherein the batches are sent one after another rather than in parallel, each batch including a at query and wherein a query included in the batches pertains to a possible split of the end-user's stipulated time period into shorter time periods and wherein a batch, which includes said query, is sent, via a API, to a data supplier server having a policy limiting at least one current aspect of the data supplier server's interaction with the split vacation deal server;

ii. storing a response, received via a API from a specific data supplier server, as a record in a cache, the record including a cost, a time period to which the cost applies, and an ID of the specific data supplier server, and incrementing monitoring data quantifying at least said specific current aspect of the one data supplier server's interaction with the split vacation deal server; and iii. after sending an individual batch from among said batches:

terminating sending of batches if a predetermined logical combination of at least the following two stopping criteria a, b, computed by said processor, is met:

a. a stopping criterion (aka "saves enough" stopping criterion) is met by an individual numerical value of a individual response from among responses received to said queries, because said individual numerical value saves enough, compared to a default numerical value, according to said "saves enough" stopping criterion; and b. a stored "avoid data supplier policy-defined limit" stopping criterion reflecting a limit defined by a policy for a specific aspect of the a data supplier server's interaction with the split vacation deal server has been reached by monitoring data quantifying at least said specific aspect of the data supplier server's interaction with the split vacation deal server;

and otherwise, if the predetermined logical combination of at least said stopping criteria a, b is not met, sending another batch from among said plural batches, iv. generating a request response, comprising an offer for a vacation deal for said time period, to said end-user by combining at least two responses from among responses received to said queries into a single user request response and sending said user request response to said end-user, when one or both of the following has occurred:

1. all splits of said user's request have been queried; and/or 2. sending of batches has terminated because the predetermined logical combination of at least stopping criteria a, b has been met.

10. A split vacation deal generating system, the system comprising:

a server including at least one processor, controlled by a non-transitory tangible computer readable medium having computer readable program code embodied therein to perform, for at least one user's request provided to the split vacation deal server by at least one end-user, requesting an offer for a vacation deal including stipulating a vacation time period:

i. sending a sequence of batches of queries, wherein the batches are sent one after another rather than in parallel, each batch including at least one query and wherein at least one query included in at least one of the batches pertains to at least one possible split of the end-user's stipulated time period into shorter time periods and wherein at least one batch, which includes said query, is sent, via at least one API, to at least one data supplier server having at least one policy limiting at least one current aspect of the at least one data supplier server's interaction with the split vacation deal server;

ii. storing at least one response, received via at least one API from at least one specific data supplier server, as a record in a cache, the record including a cost, a time period to which the cost applies, and an ID of the specific data supplier server, and incrementing monitoring data quantifying at least said specific current aspect of the at least one data supplier server's interaction with the split vacation deal server;

iii. after sending at least one individual batch from among said batches:

terminating sending of batches if a predetermined logical combination of at least the following two stopping criteria a, b, computed by said processor, is met:

a. at least one stopping criterion (aka "saves enough" stopping criterion) is met by at least one individual numerical value of at least one individual response from among responses received to said queries, because said at least one individual numerical value saves enough, compared to at least one default numerical value, according to said "saves enough" stopping criterion; and b. at least one stored "avoid data supplier policy-defined limit" stopping criterion reflecting at least one limit defined by a policy for at least one specific aspect of the at least one data supplier server's interaction with the split vacation deal server has been reached by monitoring data quantifying at least said specific aspect of the at least one data supplier server's interaction with the split vacation deal server;

and otherwise, if the predetermined logical combination of at least said stopping criteria a, b is not met, sending at least one more batch from among said plural batches, and iv. generating at least one user request response, comprising an offer for a vacation deal for said time period, to said at least one end-user by combining at least two responses from among responses received to said queries into a single user request response and sending said at least one user request response to said at least one end-user, when at least one of the following has occurred:

1. all splits of said user's request have been queried; and/or 2. sending of batches has terminated because the predetermined logical combination of at least stopping criteria a, b has been met.

11. The method of claim 1, which is performed for less than all requests provided by a population of end users.

12. The method of claim 11, which is performed only for a randomly selected subset of requests provided by a population of end users.

13. The method of claim 1, wherein each batch from among said batches sent one after another pertains to at least one possible split of the end-user's stipulated time period into shorter time periods.

* * * * *